D. TURNER.
REGISTER FOR FABRIC MEASURING MACHINES.
APPLICATION FILED AUG. 22, 1919.

1,429,983.

Patented Sept. 26, 1922.
3 SHEETS—SHEET 1.

Inventor
Douglas Turner
By
Sheridan, Jones, Sheridan & Smith
Attorney

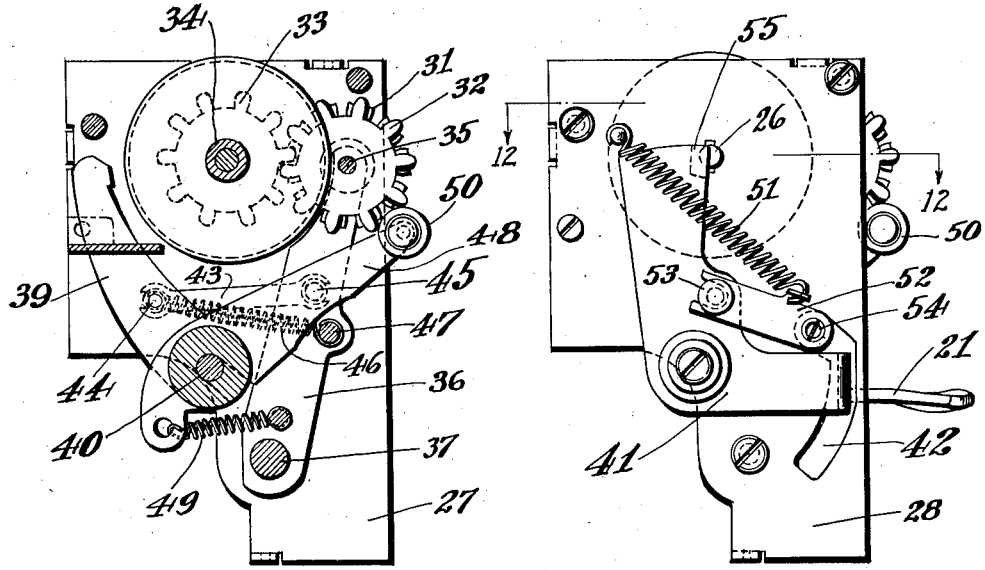
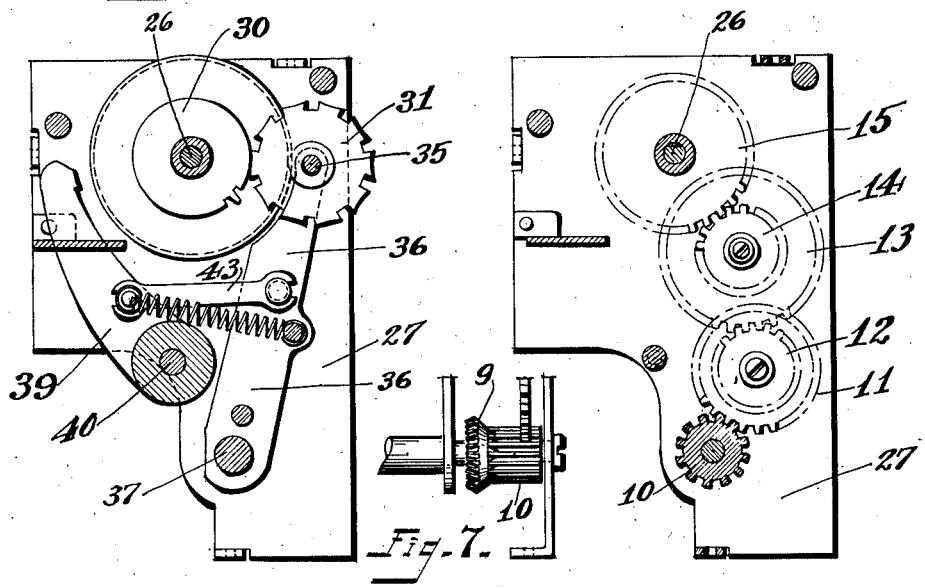

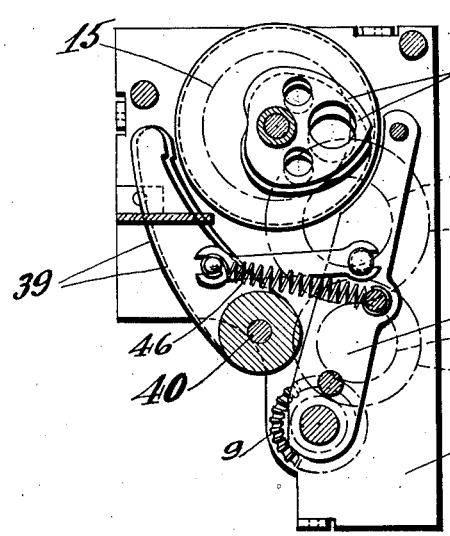
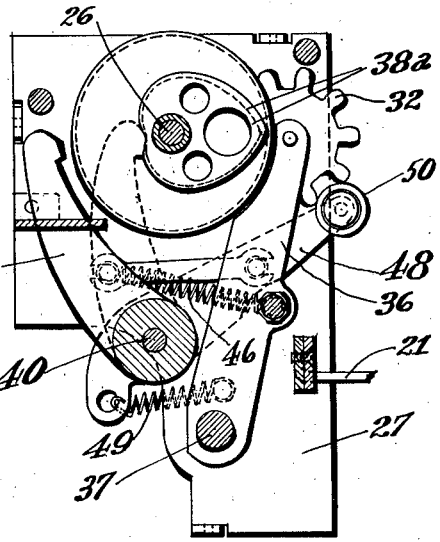
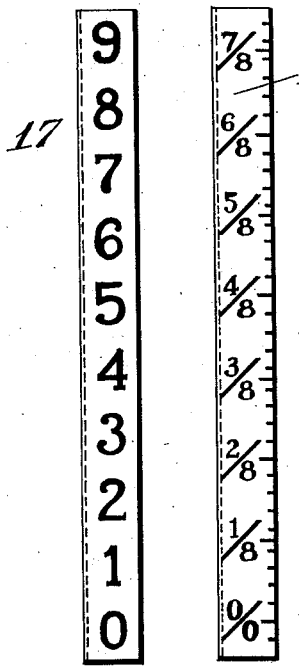
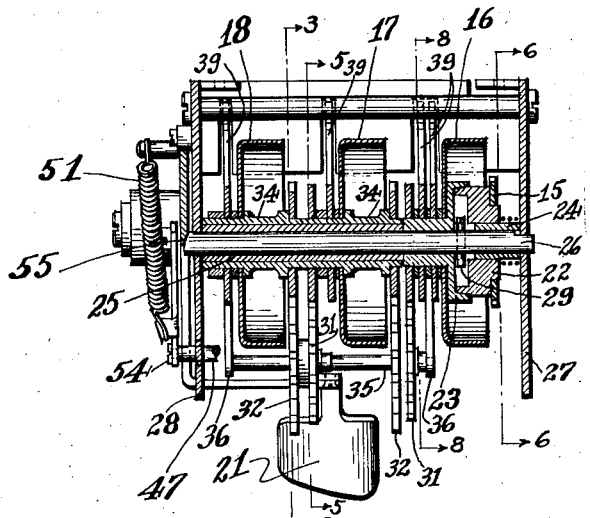

Patented Sept. 26, 1922.

1,429,983

UNITED STATES PATENT OFFICE.

DOUGLAS TURNER, OF ST. LOUIS, MISSOURI, ASSIGNOR, BY MESNE ASSIGNMENTS, TO THE MEASUREGRAPH COMPANY, A CORPORATION OF DELAWARE.

REGISTER FOR FABRIC-MEASURING MACHINES.

Application filed August 22, 1919. Serial No. 319,058.

*To all whom it may concern:*

Be it known that I, DOUGLAS TURNER, a citizen of the United States, residing at St. Louis, in the State of Missouri, have invented certain new and useful Improvements in Registers for Fabric-Measuring Machines, of which the following is a specification.

My invention relates to improvements in fabric measuring machines, and more particularly to the length indicating means or register used therein.

One well-known type of machine now in use comprises a pair of rolls, between which the fabric to be measured is drawn. A train of gears connects one of said rolls with the register or counter, whereby the latter indicates to the operator how much cloth has been passed through the machine. In a copending application, Serial Number 289,755, I have disclosed as a joint applicant such a machine having a clutch with means for disconnecting said train of gearing from the counter when said counter is reset to zero position.

It is an object of the present invention to provide, in a machine of this same character, improved means for operating the clutch and the resetting mechanism, the improved structure being not only more compact, but the action being more direct.

Another object is to provide a construction which permits of more rapid assembly than the prior structure, this advantage being attained in part by the use of slotted arms and links allowing these members to be slipped over their supporting studs or shafts instead of running the shafts through openings in said members.

Other objects and advantages will be apparent from the further description of the preferred embodiment of the invention illustrated herein.

Figure 1 of the drawings is a top plan view of the entire machine;

Figure 3 is a section on the line 3—3 of Figure 12;

Figure 4 is an end view of the register;

Figure 5 is a section on the line 5—5 of Figure 12;

Figure 6 is a section on the line 6—6 of Figure 12;

Figure 7 is an elevation of a detail;

Figure 8 is a section on the line 8—8 of Figure 12;

Figure 9 is a corresponding section of a modified construction;

Figure 10 is a development of either the units or tens wheel of the register;

Figure 11 is a development of the fractions wheel of said register; and

Figure 12 is a section on the line 12—12 of Figure 4.

Figure 1:
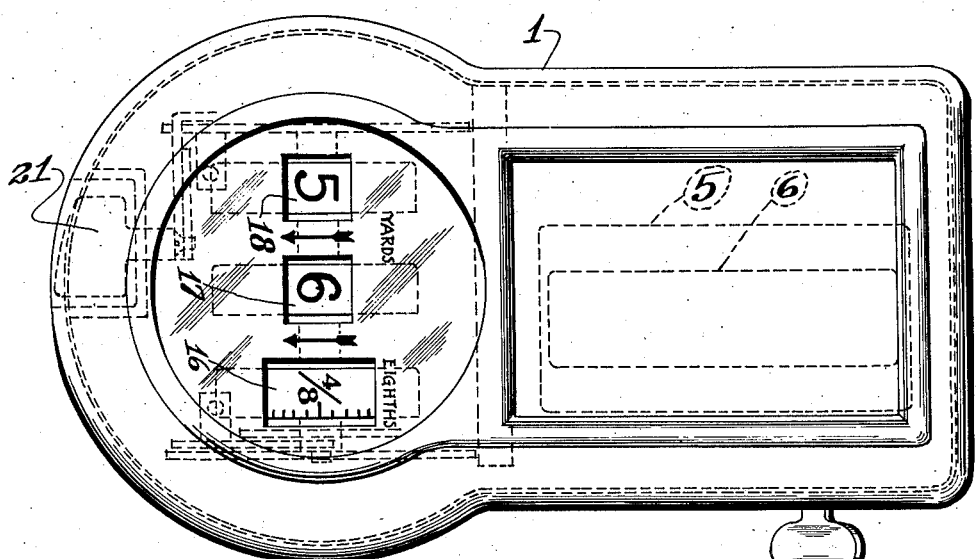

The machine comprises a suitable casing 1, having a horizontal gap or opening 2 therein to permit the insertion of the goods to be measured. Said casing encloses a base 3 which carries a vertical frame plate 4. A measuring roll 5 and a pressure roll 6 are arranged within the casing, said measuring roll 5 being mounted on a shaft 7 passing through said vertical plate 4 and provided with a suitable bearing therein. The pressure roll 6 is also supported by the vertical plate 4 by means not shown herein, and is arranged to be raised to permit the insertion of the goods between it and the measuring roll, and also to be lowered to hold said goods against said measuring roll with a yielding pressure. The operator draws the goods between the rolls, the rotary movement thereof being transmitted by the shaft 7 to the bevel gear 8 mounted thereon, thence to the bevel gear 9 and the gear 10 which turns therewith, and thence through gearing 11, 12, 13, 14, 15 to counters or indicating wheels 16, 17, 18, which are visible through openings in the top of the casing.

In beginning the operation, after the operator has inserted the goods between the rolls 5, 6, the starting button 19 is pressed, causing the rolls to come together, after which the goods is drawn through the machine, thereby rotating the counter wheels to indicate the yardage being measured. When the proper amount is passed through the machine, the operator presses the notching button 20, thereby making a cut in the edge of the goods, and simultaneously separating the pressure roll from the measuring roll, thereby permitting the goods to be removed from the machine. In order to reset the wheels to zero, the operator thereafter presses a resetting button 21, after which the machine may be used again.

The mechanism whereby the numeral wheels are driven from the gear 15 and the resetting mechanism therefor will now be described. Said gear 15 is mounted on the relatively movable member 22, of a clutch, the other member 23 thereof carrying the numeral wheel 16 of lowest denomination, i. e., the one indicating fractions of a yard. The clutch member 22 is mounted on a sleeve 24, the other member 23 of the clutch being confined between said sleeve and a second sleeve 25, both sleeves surrounding the shaft 26. Said shaft is supported at opposite ends in a pair of frame plates 27, 28, being non-rotatably mounted therein by reason of a flat face on the portion which projects through a non-circular opening in the plate 27. Said shaft carries means for engaging the movable clutch member, in the form of a pin 29 received within slots in the inner end of sleeve 24, thereby preventing rotation of said sleeve. Said shaft is permitted a slight endwise or shifting movement in its supporting plates 27, 28, by means hereinafter described, whereupon the pin 29 is moved to the right (Figure 12) thereby moving the relatively movable clutch member 22 out of engagement with clutch member 23 and disconnecting the gear 15 from the numeral wheel 16.

The clutch member 23 carries a single toothed carrying gear 30 engaging a Geneva wheel 31, providing the well known Geneva transfer or carrying mechanism. A gear 32 turns with the Geneva wheel 31 and is in mesh with a further gear 33 mounted on the sleeve 34, the units numeral wheel 17 being mounted on said sleeve. As a result of this arrangement, each complete rotation of the fractions wheel 16 results in a partial rotation of the units wheel 17. In like manner a similar transfer mechanism causes intermittent rotation of the tens counter 18, also mounted on a similar sleeve 34, both sleeves 34 turning freely on the sleeve 25. The Geneva wheels 31 and the gears 32 are carried on a shaft 35, the latter being supported at opposite ends in arms 36 mounted on the shaft 37, whereby said gears 32 may be swung out of engagement with their cooperating gears as hereinafter described.

In order to restore the numeral wheels to initial position, a plurality of heart-shaped cams 38 are provided, the clutch member 23 having two such cams thereon slightly displaced from each other as shown in Fig. 8. This pair of cams cooperate with a pair of resetting levers 39 mounted on the shaft 40. Each of the unit wheels has its corresponding heart-shaped cam 38 rigid with it. When shaft 40 is rocked by means hereinafter described, the pointed ends of the resetting levers 39 engage the heart-shaped cams and thereby restore the numeral wheels and other parts associated therewith to initial position. The use of two heart-shaped cams and two resetting levers prevents the locking of the parts on dead center, as one or the other of said levers will impart the initial turning movement to its corresponding cam. In the machine shown in the drawings, this double cam arrangement is provided only in connection with the numeral wheel of lowest denomination, i. e., the fractions wheel, the units and tens wheels being provided merely with a single heart-shaped cam and cooperating lever in each case. However, this duplicate arrangement may be provided in connection with each numeral wheel, if desired.

In Fig. 9 a slightly modified arrangement is shown, in which the two cams 38$^a$ are of slightly different sizes, the purpose being the same, to prevent locking on a dead center. These features are explained more fully in the co-pending application previously referred to.

Figure 2:
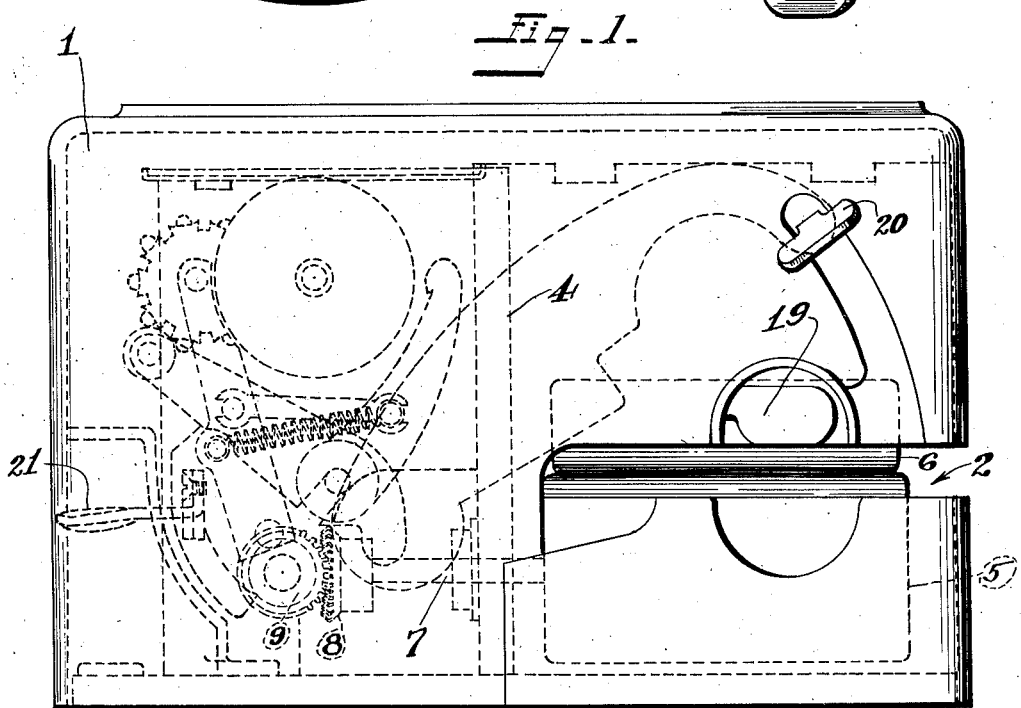
Figure 2 is a side elevation thereof.

In order to actuate the cams, a hand-actuated member, or operating lever is mounted on the shaft 40, said lever being preferably in the form of a bell crank lever 41, one arm being bent, and projecting inwardly through a slot 42 in the plate 28, the resetting button 21 being secured to said bent arm and operating in a recess in the casing. (See Figs. 1 and 2). This hand-actuated member effects the return of the counter wheels to zero. When the operator presses said resetting button, the levers 39 are brought into contact with the heart-shaped cams. This is accomplished by means of the bell crank 41 and operating link 52 which latter rocks the arms 36, thereby causing the levers 39, through the medium of the springs 46, to engage said cams. Slotted links 43 connect said levers 39 and pivoted arms 36, said links being interposed between suitable studs 44, 45, carried by said levers and arms respectively. The links 43 are merely spacing elements adapted to maintain the said levers and arms in proper relation. The springs 46 are also secured to the studs 44, 45, and to pins 47 on the arms 36. With this organization, the movement of the resetting button swings the arms 36 away from the numeral wheels, thereby carrying the gears 31, 32, away from the cooperating gears which turn about the supporting shaft 26. When these parts are thus engaged, the numeral wheels are reset to zero position without interference from the carrying mechanism.

Shaft 40 also carries a plurality of slotted arms 48, the slots whereof permit said arms to be slipped over said shaft quickly, thereby facilitating the separation or assembly of the parts of the register. The lower end of each arm is connected with a spring 49 secured also to the arms 36, thereby holding the roller 50 at the upper end thereof in yielding engagement with the teeth of the gear 32. This roller holds said gear against rotation during the time it is out of engagement with its corresponding gear 33. It will be noted that the centers 40 and 37 for the arms 48 and 36 respectively, are so displaced from each other and from the centers of the gears 32 and rollers 50 that as these latter parts swing away from the main shaft 26, a slight relative movement is imparted to the gear 32 and roller 50. This slight movement insures the proper remeshing of the gears 32, 33, and of the Geneva stop mechanism, the rollers 50 being yieldingly pressed between the teeth of the gear 32.

After the operator depresses the resetting button 21, the latter is restored to initial position by a spring 51 secured to the end plate and hooked into an opening in a link 52 which is slotted at one end to fit over a pin 53 on the bell crank lever 41, and apertured at its other end for engagement with an extension 54 of the bar 47, which moves in the slot 42. Said bell crank lever has its upper arm provided with a beveled edge 55 which engages the correspondingly beveled projecting end of the main shaft 26, (Figs. 4 and 12), thereby shifting or moving said shaft slightly to the right as seen in Fig. 12 against the action of the coiled spring 51 and disengaging the friction clutch members 22, 23, which are normally held in engagement by said spring. This disengagement is effected by the pin 29 carried by the shaft 26, the non-rotatable sleeve 24 holding the clutch member 23 and serving to prevent it from following the clutch member 22 as the latter is moved to the right. The sleeve 25 takes the end thrust of the clutch when the parts are in engagement.

With the organization described, it will be seen that the fractions numeral wheel is disconnected from the measuring roll gear train during the time said numeral wheel and the other numeral wheels are reset to zero position. Accordingly there is no unnecessary friction such as would be occasioned were the measuring roll driving connection to be maintained. The register as a whole is also compact, due to the use of the main shaft as part of the clutch operating means, and the parts may be readily assembled by virtue of the slotted construction of certain of the arms and links previously described.

The invention is not limited to the embodiment thereof described herein, but may be embodied in numerous other forms.

I claim:—

1. In a machine of the kind described, the combination of a shaft, a plurality of counter wheels loosely mounted on said shaft, a clutch for driving the wheel of lowest denomination, carrying mechanism normally connecting the counter wheels for driving those of higher denomination from the wheels of lower denomination, said shaft constructed to open the clutch by a longitudinal shifting movement of the shaft, a hand-actuated member, means actuated thereby for shifting the shaft longitudinally to open the clutch, means also actuated by the hand-actuated member for disconnecting the carrying mechanism from the counter wheels, and means also actuated by the hand-actuated member for effecting the return of the counter wheels to zero.

2. In a device of the class described, a pair of supporting members, a shaft longitudinally movable therein, a plurality of numeral wheels surrounding said shaft, a clutch for driving the wheel of lowest denomination, and constructed to open by the longitudinal shifting of the shaft, carrying means from the lowest denomination wheel to the wheels of higher denomination, a hand-actuated member having means for shifting the shaft longitudinally to open the clutch, and means also actuated by the hand-actuated member for restoring said numeral wheels to zero position during such period.

3. In a device of the class described, a pair of supporting plates, a shaft non-rotatably and slidably mounted therein, a clutch carried by said shaft, driving means connected to one member of said clutch, a numeral wheel connected to the other member of said clutch, a heart-shaped cam associated with said numeral wheel, means engaging said cam to restore said wheel to zero position, and means engaging one end of said shaft to move it longitudinally and disengage said clutch members during such restoration.

4. In a device of the class described, supporting members, a shaft non-rotatably and slidably mounted therein, two sleeves arranged on said shaft in longitudinal alinement, means on said shaft cooperating with one of said sleeves for preventing the rotation thereof, a clutch member surrounding said shaft and positioned between said sleeves, a cooperating clutch member rotatably mounted on said non-rotatable sleeve, means holding said clutch members in yielding engagement, a numeral wheel arranged to turn with said first-named clutch member, a numeral wheel rotatably mounted on the other of said sleeves, carrying mechanism connecting said numeral wheels, and means for moving said shaft longitudinally to disengage said clutch members for removing said carrying mechanism from cooperative engagement with said numeral wheels and for restoring said numeral wheels to zero position.

5. In a device of the class described, a pair of supporting plates, a shaft non-rotatably supported in openings therein, two sleeves surrounding said shaft, one of which is slotted, a pin projecting from said shaft into one of said slots, a clutch member mounted on said slotted sleeve and arranged to be engaged by said pin when said shaft is moved longitudinally, a cooperating clutch member positioned between said sleeves and held thereby against movement along said shaft, a gear turning with one of said clutch members, a numeral wheel turning with the other of said clutch members, and means for moving said shaft longitudinally to disengage said clutch members.

6. In a device of the class described, the combination of a support, a shaft longitudinally movable therein, a pair of sleeves on said shaft, a plurality of counter wheels loosely mounted thereon, a clutch having a relatively fixed clutch-member mounted on the shaft between said sleeves and a relatively movable clutch member rotatable on one of said sleeves, means on said shaft for engaging the movable clutch member to move the same to open the clutch, a spring holding said members in yielding engagement, one of said sleeves abutting against the relatively fixed clutch member, and serving to resist the thrust of said spring, and the other of said sleeves engaging the fixed clutch member and holding the same when said shaft is moved to open the clutch.

7. In a device of the class described, a pair of supporting plates, a rod carried thereby, a shaft longitudinally movable in said plates, a bell crank lever mounted on said rod and having one arm constructed to cooperate with an end of said shaft to shift the latter longitudinally, numeral wheels surrounding said shaft, carrying mechanism connecting said wheels, means for disengaging said carrying mechanism from said wheels, said means being operated by said bell crank lever, means also operated by said lever for restoring said numeral wheels to zero position during said disengagement, and means operated by the shifting movement of said shaft for disconnecting said numeral wheel of lowest denomination from its driving means to permit the same to be restored to zero.

8. In a device of the class described, a supporting shaft, a plurality of numeral wheels surrounding said shaft, a resetting rod and a resetting lever thereon, resetting arms on said rod, carrying mechanism for said numeral wheels, supporting arms therefor pivotally mounted independently of said resetting rod, a spring connecting said resetting arms and said supporting arms, and additional slotted arms fitted over said rod and yieldingly bearing against part of said carrying mechanism.

9. In a device of the class described, two pairs of arms independently mounted, removable slotted links connecting opposite arms of a pair, carrying mechanism carried by one pair of arms, resetting mechanism engaged by the other pair of arms, and a third series of slotted arms engaging said carrying mechanism and yieldingly secured to the arms of one of said pairs.

In testimony whereof, I have subscribed my name.

DOUGLAS TURNER.